Nov. 25, 1941.  R. R. CAMPBELL  2,263,569

MACHINE FOR APPLYING ADHESIVE TO STRIP MATERIAL

Filed March 14, 1940 4 Sheets-Sheet 1

INVENTOR
Rosel R. Campbell
By his attorney
Victor Cobb.

Nov. 25, 1941.    R. R. CAMPBELL    2,263,569
MACHINE FOR APPLYING ADHESIVE TO STRIP MATERIAL
Filed March 14, 1940    4 Sheets-Sheet 2
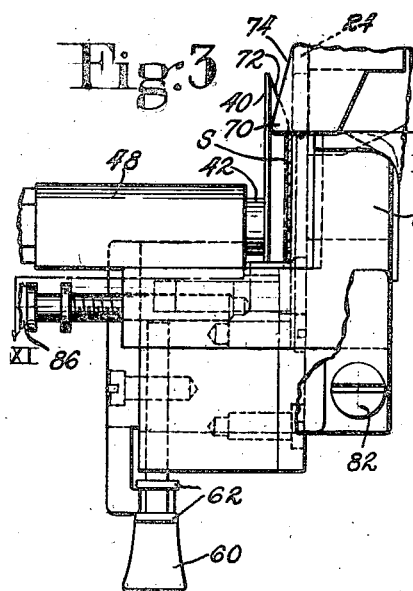
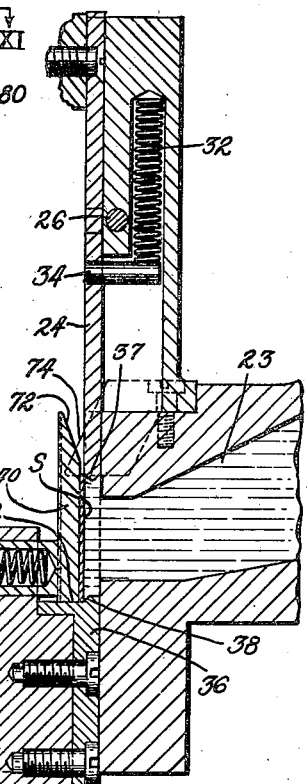
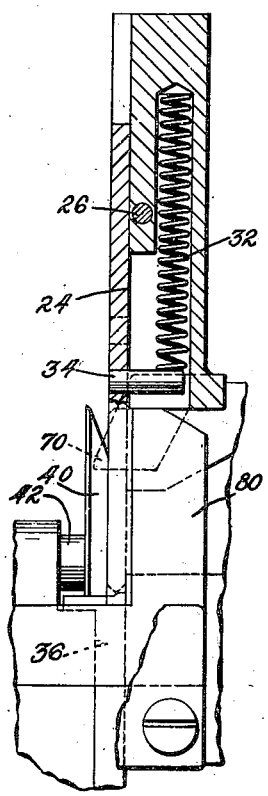
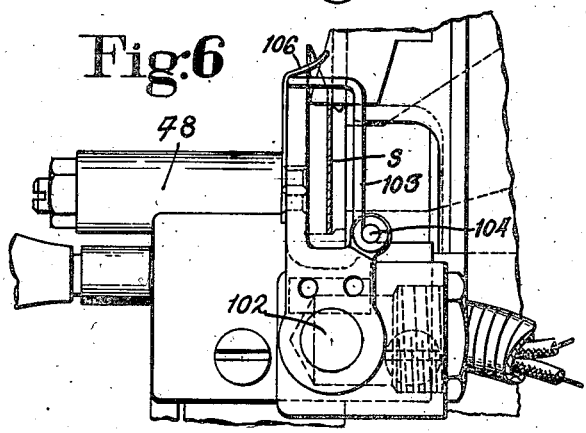
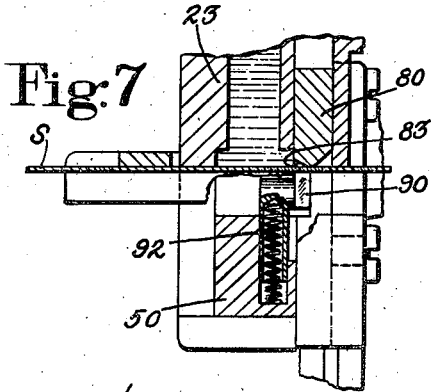
INVENTOR
Rouel R. Campbell
By his attorney
Victor Cobb Nov. 25, 1941.                R. R. CAMPBELL                2,263,569
           MACHINE FOR APPLYING ADHESIVE TO STRIP MATERIAL
                       Filed March 14, 1940        4 Sheets-Sheet 3
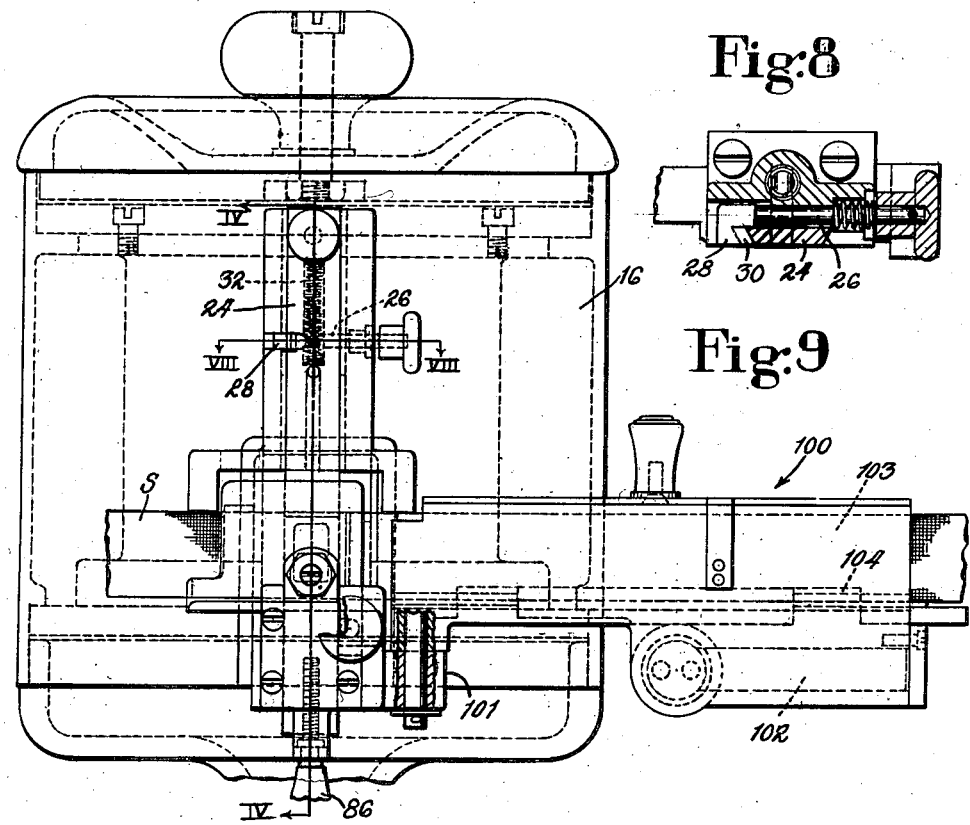
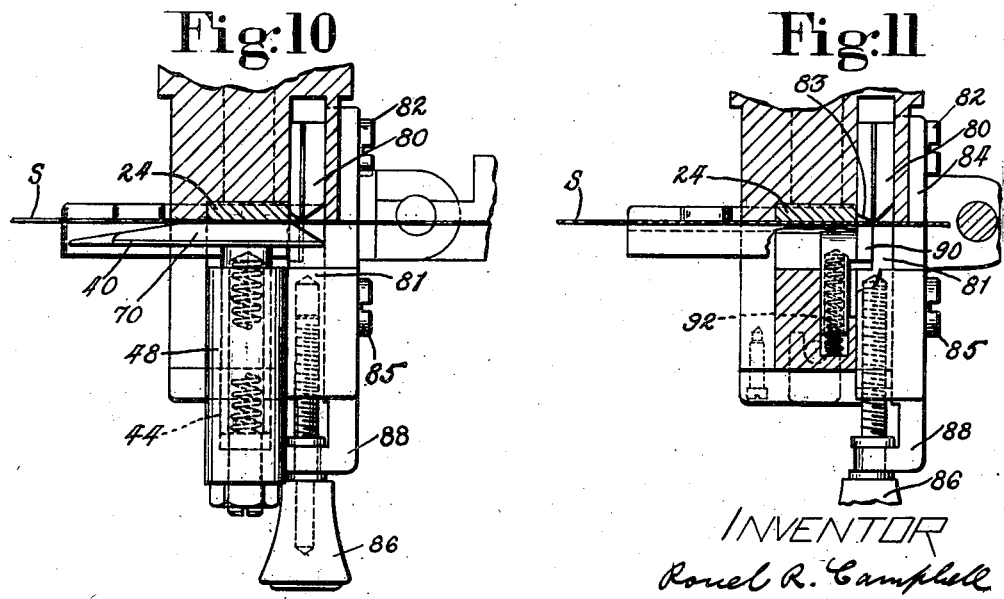
INVENTOR
Rouel R. Campbell
By his attorney
Victor Cobb Nov. 25, 1941.   R. R. CAMPBELL   2,263,569
MACHINE FOR APPLYING ADHESIVE TO STRIP MATERIAL
Filed March 14, 1940   4 Sheets-Sheet 4

INVENTOR
Rouel R. Campbell
By his Attorney
Victor Coll.

Patented Nov. 25, 1941

2,263,569

UNITED STATES PATENT OFFICE 2,263,569

MACHINE FOR APPLYING ADHESIVE TO STRIP MATERIAL

Rouel R. Campbell, Lynn, Mass., assignor to United Shoe Machinery Corporation, Borough of Flemington, N. J., a corporation of New Jersey Application March 14, 1940, Serial No. 323,973

16 Claims. (Cl. 91—30)

This invention relates to the application of adhesive material to strips of fabric or other strip material intended to be attached to a shoe part in the manufacture of shoes. It is to be understood, however, that the invention and various important features thereof may have other applications and uses.

It is an object of this invention to secure the application of adhesive material to edge portions of strip material in amounts substantially less than that applied to the body of the strip between opposite marginal portions thereof, one of the purposes being to preclude the escape of such material from beneath the strip and its application to a shoe part beyond the strip applied to such shoe part where the presence of an adhesive would be undesirable. Another object of the invention is to facilitate introduction of strip material into the machine by a sidewise movement thereof, thereby obviating the necessity of threading it into the machine, as by an endwise movement of the strip. It is still another object of the invention to make provision against the loss of adhesive material, as by dripping, while the machine is in use.

For closing the outlet opening of the receptacle or container when no work is being done, there is provided a gate slidable in a guideway in a wall of the container. In the illustrated construction, this gate has its end beveled off so that when it is in open position it presents a face inclined inwardly toward an adjacent edge of the strip to which adhesive is being applied, the effect being to provide a restricted space or recess adjacent to the said edge of the strip whereby the amount of adhesive applied to said adjacent edge portion of said strip is limited. Preferably also, a plate in line with the movable gate and with which the gate co-operates in closing the outlet opening of the container is also beveled off along a surface adjacent to the other edge of the strip, thereby to provide a shallow recess into which adhesive material may flow in an amount very substantially limited in comparison with the amount of adhesive material opposite to the body portion of the strip between its side edges. These elements of the construction are important since they are illustrative of means by which a much smaller amount of adhesive material is applied to both the longitudinal marginal portions of the strip, thus contributing materially to a most desirable condition in which the escape of adhesive material beyond the edges of the strip upon application of the latter to a shoe part is obviated, whereby the strip may be applied perfectly without the appearance of excess adhesive. From another viewpoint, this feature of the invention may be regarded as residing in the provision, at the outlet opening of the container, of flanges or lips which project over the longitudinal marginal portions of the strip to be coated with adhesive, the said flanges or lips being beveled or otherwise constructed to serve as restrictions by which the adhesive is allowed to reach the said marginal portions of the strip in only limited amounts. Because of its viscosity, the adhesive does not flow freely enough into the shallow recesses back of the beveled flanges or lips to provide any excess adhesive on the exposed marginal surfaces and hence not enough to leak around the edges of the strip to the back face thereof where the presence of any adhesive whatever would be most objectionable.

For backing the strip material while the latter is passing the outlet opening of the container to have adhesive material applied thereto, there is provided a spring pressed backing member which is thus self-adjusting to suit work pieces of different thicknesses, the yielding mounting for the backing member also permitting the latter to yield to accommodate a thicker portion of a strip, for instance a lapped portion thereof, while such thicker portion is entering and leaving the space at the exit opening of the container. Preferably and as shown, one edge of the yielding backing member is beveled off so that a tensioned part of the strip may be forced against such beveled or slanting surface in the operation of retracting the backing member and introducing the strip by movement thereof in a direction transverse of its length, whereby introduction of the strip is greatly facilitated, since it does not have to be threaded by endwise movement past the outlet opening of the receptacle or container.

These and other important features of the invention and novel combinations of parts will now be described in detail in the specification and then pointed out more particularly in the appended claims.

In the drawings,

Fig. 3 is a side view of elements shown in Fig. 2;

Fig. 4 is an enlarged sectional view of the group of elements shown in Fig. 2, taken along the line IV—IV of Fig. 9;

Fig. 5 is a detail showing a gate member in a position different from that in Fig. 4;

Fig. 6 is a detail view of a strip guideway looking from the left in Fig. 9;

Fig. 7 is a detail view, partly in section, of the outlet from the receptacle and of a stripper for controlling the application of adhesive to the strip;

Fig. 8 is a sectional detail view taken on the line VIII—VIII of Fig. 9;

Fig. 9 is a front view of apparatus shown in Fig. 1;

Fig. 10 is a sectional view taken along the line X—X of Fig. 1;

Fig. 11 is a sectional view taken along the line XI—XI of Fig. 3;

Figure 2:
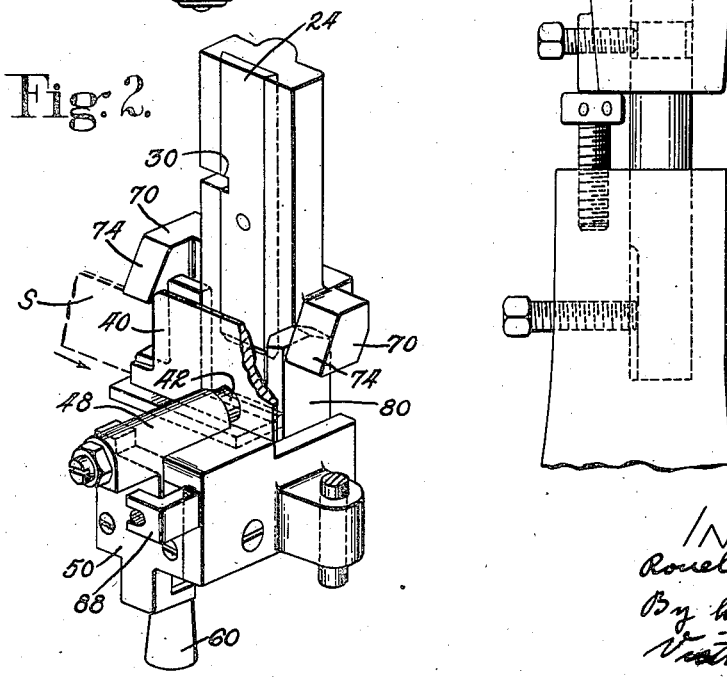
Fig. 2 is a detail view of the work positioning and adhesive controlling elements shown at the left in Fig. 1.
Figure 12:
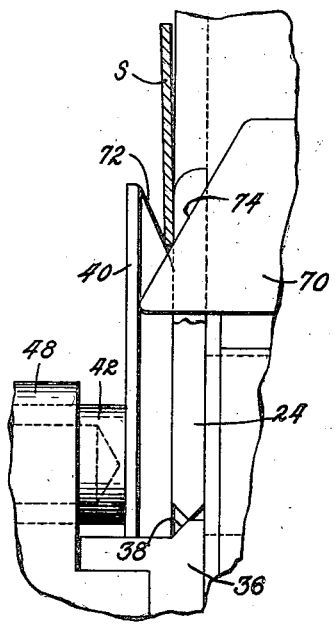
Figure 13:
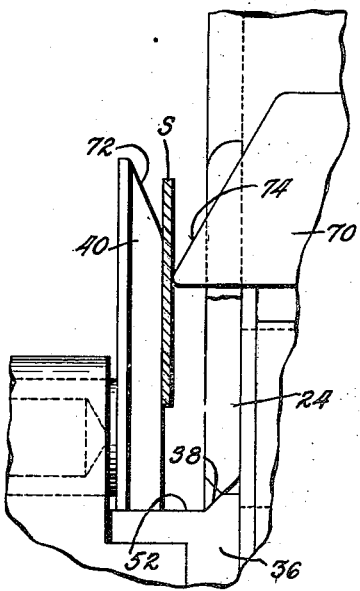
Figure 14:
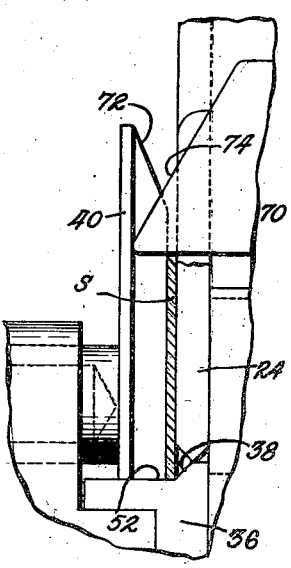
Figure 15:
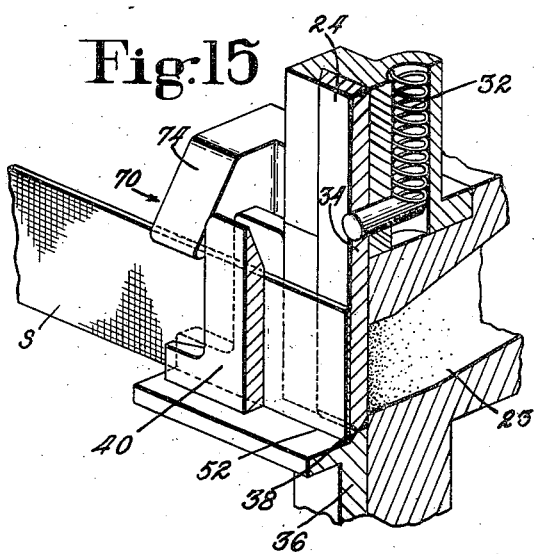

Figs. 12 to 14, inclusive, are views illustrating the introduction of the strip material S into position for the application of adhesive thereto; and Fig. 15 is an enlarged view of part of Fig. 2 with the strip in position for treatment but with the gate lowered to prevent the application of material.

Figure 1:
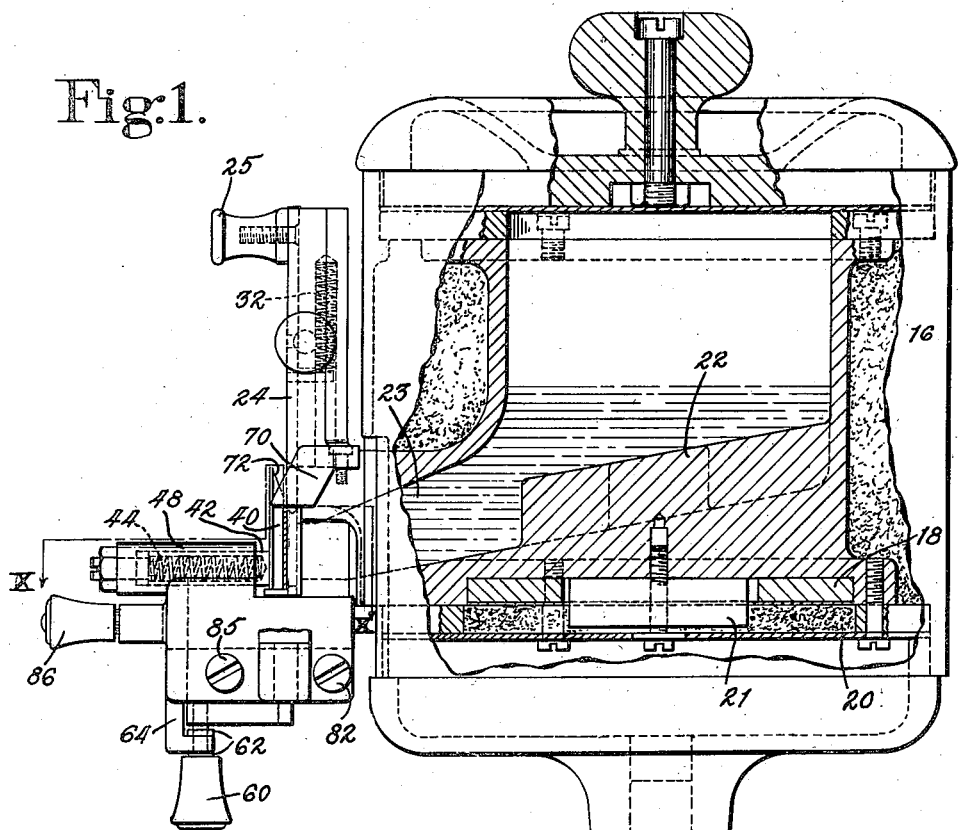
Fig. 1 is a view in side elevation, and partly in section, of an adhesive applying apparatus illustrating one embodiment of the invention.

In the illustrated embodiment of the invention, which is particularly designed for the application of a thermoplastic adhesive to a strip S of material, such as a fabric suitable for use as a binding for a shoe insole, there is provided a receptacle 16 shown in section in Fig. 1 as having a heating unit 18 set into a recess in the bottom wall thereof, a layer of heat insulating material 20 being provided below the heating unit to retain the heat of the latter. There is also conveniently provided a thermostat 21 to regulate the temperature of the receptacle. As indicated at 22, the floor of the receptacle 16 is provided with a raised portion or rib to increase the heating surface in contact with the adhesive material within the receptacle. In the front part of the receptacle 16, there is a duct 23 leading therefrom to an opening (Figs. 1, 4 and 7) through which the heated adhesive passes into contact with the strip material S when a gate 24 is in its raised position (Figs. 1, 2, 4 and 8).

For holding the gate 24 in its raised position, there is provided a locking pin 26 (Fig. 8) having a head portion 28 adapted to engage a slot 30 (Figs. 2 and 8) in one edge of the gate member 24. Upon pressing the locking pin 26 toward the left in Figs. 8 and 9, the gate member 24 is released and is at once projected downwardly, by a spring 32 pressing on a stud 34 rigid with the gate member (Figs. 1, 4, 5, and 9), to a position where its lower end contacts a plate 36 (Figs. 4, 5, 12) thereby closing the outlet opening from duct 23 and preventing the application of adhesive material to the strip material S or, alternatively, preventing the escape of such material when no strip S is in position in the apparatus for the application of adhesive thereto. When the gate member 24 is in its raised position (Figs. 1, 3, 4), adhesive material in the duct leading from the receptacle reaches the exposed face of the strip material S and becomes applied thereto.

In order to restrict the amount of adhesive material reaching the upper marginal portion of the strip S, the lower end of the gate member 24 is provided with a flange or lip which overhangs the upper marginal portion of the strip S and which is beveled at 37 in a direction slanting upwardly and toward the strip S to form a relatively small or shallow recess, as most clearly indicated in Fig. 4. It will be understood that viscosity of the cement prevents its flowing freely into such shallow recess, whereby the amount of adhesive applied to the upper margin of the strip is suitably restricted. For a similar reason the plate 36 has its upper edge beveled at 38 (Fig. 4) to provide a surface slanting downwardly and toward the strip material S, to form a flange or lip opposite the lower margin of the strip S and having the effect of restricting the amount of material which can enter the shallow recess between the flange or lip and the lower margin of the strip and be applied thereto. The strip S is supported against the pressure of the adhesive material by a backing member 40 (Figs. 1, 2, 4 and 10).

Upon reference to said figures of the drawings, it will be observed that the backing member 40 is vertically arranged to support the strip member S opposite the opening of the discharge duct of the receptacle and that it is integral with a horizontal tubular member 42 containing a spring 44 (Fig. 4) adapted to be tensioned adjustably by a screw threaded plug 46. As shown, the tubular member 42 is slidably mounted in a casing or housing 48 integral with a block 50.

Conveniently the block 50 has secured thereto the plate 36 (Figs. 4, 12, 15) which provides a surface 52 serving as a support and gage member for the lower edge of the strip S undergoing treatment. As indicated in Figs. 1, 2, and 4, the block 50 with the parts attached thereto is vertically adjustable, adjustment being secured by means of a manually operable member 60 screw-threaded into the member 50. Said member 60 has spaced collars 62 for engagement with opposite surfaces of an extension 64 carried by a stationary part of the frame. It will be understood that the collars 62 prevent endwise movement of the member 60 and that rotation of said member 60 will effect an up-and-down adjustment of the block 50 and hence of the lower gage surface 52 and of the backing member 40.

For co-operation with gage surface 52 in positioning the strip S, there is provided an upper gage device comprising gaging members 70 (Figs. 1, 2, 3 and 12 to 15 inclusive) carried by the stationary guideway for the gate member 24. Conveniently the gages 70 are stationary since the lower gaging surface or support 52 may be readily adjusted upwardly or downwardly to accommodate strips S of different widths.

To facilitate the introduction of a strip S into position for treatment, the upper part of the backing member 40 is beveled off as at 72 (Figs. 1, 3, 4, and 12 to 14, inclusive). Preferably, and as shown, the gage members 70 are provided with slanting surfaces 74 which intersect the plane of the surface 72 on the backing member 40. To introduce a strip S, the latter is placed under tension in the hands of the operator and is presented in the position indicated in Fig. 12 and then moved downwardly as clearly shown in Fig. 13, this movement of the strip S having the effect of moving the backing member 40 to the left against the tension of the spring 44 (Fig. 4), downward movement of the strip S being continued until it reaches the level shown in Fig. 14, that is, under the gage 70. When it reaches this level, the backing member 40 is projected to the right to press the strip S against the face of the gate member 24 which at this time is in its lowermost position in which it closes the opening from the receptacle. It will be readily understood that this arrangement constitutes a feature of substantial importance, since this method of introducing the strip obviates any necessity for attempting to thread the strip S across the opening by an endwise movement of the strip. After the strip is in place the operator lifts the gate 24 to its upper or normal position of rest (Fig. 4), in which position it is locked by the latch member 26.

As the strip S is drawn across the opening of the duct 23 from the receptacle, adhesive material is applied to that surface of the strip which faces the opening. In order to regulate the amount of adhesive (which appears as a layer of adhesive on the strip after the latter passes by the opening) there is provided a stripper member 80 (Figs. 2, 7, 10, 11). As shown, the stripper member 80 has its operative end portion rather sharply beveled off, the result being to provide a rather narrow vertical edge which serves as a wiper to hold back all but a predetermined amount of adhesive on the surface of strip S. This stripper member 80 is integral with a block 81 (Fig. 10) separate from the block 50 and not vertically adjustable along with the lower gaging surface 52. However, the block 81 and stripper 80 are adjustable in a horizontal direction. In order that the stripper 80 may be adjusted in directions toward and from the strip S, the block 81 is arranged to be adjusted by a manually operated member 86 screw threaded into the block and rotatable in a stationary abutment 88. Screws 82 and 85 hold a face plate 84 to the frame to cover block 81.

In order to prevent dripping of adhesive material downwardly along the beveled surface 83 of the stripper 80, there is provided a spring pressed block 90 (Figs. 7 and 11) having a bevel complemental to surface 83 and located below the edge of the strip S. Said block or seal 90 is mounted in the larger block 50 and is arranged to be pressed constantly in contact with said beveled surface 83 by a spring 92.

After the strip S passes by the stripper 80, it is conducted along a guideway 100 detachably supported on the receptacle by a depending pin entering a bracket 101 (Fig. 9). The lower wall of the guideway is heated to maintain the adhesively coated strip in suitable condition to cause the firm adherence of the strip to a shoe part to which it is applied. Accordingly, a projecting portion of the lower wall of the guideway 100 is provided with a pocket for the reception of an electrical heating unit, indicated generally at 102 (Figs. 6 and 9). Conveniently also one wall 103 of the guideway 100 is hinged, as indicated at 104, so that it may be opened up to permit of access to the strip and to facilitate introduction or removal thereof, said hinged wall being held in closed position by a spring latch member indicated at 105.

If a strip of material is to be introduced into position for the application of adhesive, the wall 103 of guideway 100 is swung open and then a suitable portion of the strip is placed under tension and is introduced edgewise, as already described, and as indicated in Figs. 11 to 13, inclusive, of the drawings, this operation taking place while the gate member 24 is in its lower position shown in Fig. 5 of the drawings. After the strip has been introduced, the gate 24 is lifted by the handle 25 to a position where the latch 26 (Figs. 7 and 8) becomes operative to hold the gate member in such raised position. The adhesive then flows through the outlet opening of the receptacle until it contacts the exposed surface of the strip S. As the strip is moved along, adhesive is applied to it and the thickness of the layer thus applied is predetermined by the stripper 80. During such movement of the strip S, the yielding backing member 40 keeps the strip pressed against the outlet opening of the receptacle and also yields, where necessary, to accommodate thicker portions of the strip, as where the latter presents a lapped portion. It will be understood that this means for applying a predetermined layer of adhesive to a strip is intended to be used with a machine which feeds the strip and applies it to a shoe part. To accommodate strips of different widths the lower gaging surface 52 is adjustable upwardly or downwardly with relation to the stationary gage device comprising the gage members 70 adapted to contact the upper edge of the strip to position the latter.

Having thus described my invention, what I claim as new and desire to secure by Letters Patent of the United States is:

1. In a machine for applying adhesive to a strip of material, a container for adhesive material having an outlet opening, a member backing the strip oppositely to said opening while adhesive is being applied thereto, and restrictions provided at said outlet opening to limit the amount of adhesive applied to the opposite marginal portions of the strip.

2. In a machine for applying adhesive to a strip of material, a container for adhesive material having an outlet opening, a member backing the strip oppositely to said opening while adhesive is being applied thereto, a stripper at one side of the outlet opening to regulate the amount of adhesive applied to the body of the strip, and means associated with two directly opposite walls of the outlet opening for restricting the amount of adhesive applied to the opposite marginal portions of the strip while any given portion thereof is exposed to the adhesive at said outlet opening.

3. In a machine for applying adhesive to a strip of material, a container for adhesive material having an outlet opening, and a member backing the strip oppositely to said opening, said container at its outlet opening having recesses of restricted depth into which only very small amounts of adhesive may flow, and said recesses being opposite the upper and lower margins of the strip, whereby the amount of adhesive applied to the opposite marginal portions of the strip is substantially restricted.

4. In a machine for applying adhesive to a strip of material, a container for adhesive material having an outlet opening, a member backing the strip oppositely to said opening, a gate member for closing said outlet opening, said gate member being movable to one side of the opening to permit the adhesive material in the container to reach the surface of the strip exposed at the outlet opening, whereby said adhesive is applied to the exposed surface of the strip, a stripper at one side of the outlet opening to regulate the amount of adhesive applied to the body of the strip, and shallow recesses respectively in the end of the gate member and in the outlet wall opposite the gate member for receiving only very small amounts of adhesive, said recesses being opposite the upper and lower margins of the strip, whereby the amount of adhesive applied to the opposite marginal portions of the strip is substantially restricted.

5. In a machine for applying adhesive to a strip of material, a container for adhesive material having an outlet opening, a member backing the strip oppositely to said opening, a gate member slidably supported for movement to close the opening, said gate member being normally at one side of said opening while the strip is being moved past said opening, and said gate member, when in its normal open position, having an end portion located adjacent to a side edge of said strip to prevent the escape of adhesive material, said end portion having a surface beveled off in a direction toward the strip material to limit the amount of adhesive opposite to said side edge of said strip, and a member at the outlet opening on the side opposite to the gate member with which the latter co-operates to close said opening, said member also having a surface beveled off to slant toward the other side edge portion of said strip thereby to restrict the amount of adhesive material to be applied to the last-mentioned edge portion of said strip, whereby the longitudinal edges of the strip have adhesive material applied thereto in amounts substantially less than that applied to the body portion of the strip.

6. In a machine for applying adhesive to a strip of material, a container for adhesive material having an outlet opening, a member backing the strip oppositely to said opening, a gate member slidably supported for movement in a vertical direction across the opening, said gate member being normally in its raised position while the strip is being moved past said opening, and said gate member having its lower edge beveled in a direction upward and toward the strip to limit the amount of adhesive opposite to the upper marginal portion of said strip, and a member below the outlet opening of the container with which the gate member cooperates to close said opening, said member also having a surface beveled off to slant downwardly and outwardly toward the lower edge portion of said strip, thereby restricting the amount of adhesive material to be applied to the lower marginal portion of said strip, whereby the upper and lower marginal portions of the strip have adhesive applied to them in amounts substantially less than that applied to the body portion of said strip.

7. In a machine for applying adhesive to a strip of material, a container for adhesive material having an outlet opening, a member backing the strip oppositely to said opening, means to mount said backing member for yielding movement toward and from said outlet opening, said backing member having a slanting surface to guide the strip when a tensioned part thereof is moved in a direction transverse of its length in introducing it into the machine, said backing member being forced backwardly during introduction of the strip because of its yielding mounting and thereafter becoming operative to press said strip into its proper place across the outlet opening of the container.

8. In a machine for applying adhesive to a strip of material, a container for adhesive material having an outlet opening, a member backing the strip oppositely to said opening, means to mount said backing member for yielding movement toward and from said outlet opening, and a stationary member having a slanting surface, said backing member having also a slanting surface intersecting the slanting surface on the stationary member, said slanting surfaces serving to guide the strip when a tensioned part thereof is moved in a direction transverse of its length in introducing it into the machine, said backing member being forced backwardly during introduction of the strip because of its yielding mounting and thereafter becoming operative to press said strip into its proper place across the outlet opening of the container.

9. In a machine for applying adhesive to a strip of material, a container for adhesive material having an outlet opening, a member backing the strip oppositely to said opening, means to mount said backing member for yielding movement toward and from said outlet opening, a gaging device to determine the position of one edge of the strip undergoing treatment, and a gaging device for the other edge of said strip, one of said gage devices having a slanting surface and said backing member having also a slanting surface intersecting the slanting surface on the gage device, said slanting surfaces serving to guide a tensioned part of the strip when it is shoved against them in a direction transverse of its length in introducing it into the machine, and said backing member yielding backwardly under pressure by said tensioned part of the strip and thereafter becoming operative to press said strip into its proper place across the outlet opening of the container.

10. In a machine for applying adhesive to a strip of material, a container for adhesive material having an outlet opening, a spring pressed member backing the strip oppositely to said opening, an upper gaging device to determine the position of the upper edge of the strip undergoing treatment, and a support for the lower edge of said strip, said upper gaging device having a slanting surface and said backing member having also a slanting surface intersecting the slanting surface on the gage device, said slanting surfaces serving to guide the strip when a tensioned part thereof is shoved downwardly along said slanting surfaces in a direction transverse of the length of said strip in introducing it into the machine, and said backing member yielding backwardly under pressure of said strip and thereafter pressing the strip into its proper place across the outlet opening of the container.

11. In a machine for applying adhesive to a strip of material, a container for adhesive material having an outlet opening, a member backing the strip oppositely to said opening, a stripper at one side of said outlet opening, said stripper having a face beveled off to present a narrow stripper surface opposite to the strip and adjustable to regulate the amount of adhesive material being applied to said strip, and a spring pressed block having a slanting surface arranged to be yieldingly pressed into contact with said beveled off surface on the stripper at a point below the lower edge of the strip material thereby to close the opening formed by said beveled off surface of the stripper, whereby dripping of the adhesive material is prevented.

12. In a machine for applying adhesive to a strip of material, a container for adhesive material having an outlet opening, a member backing the strip oppositely to said opening, a stripper at one side of said exit opening, said stripper having a face beveled off to present a narrow stripper surface opposite to said strip and adjustable to regulate the amount of adhesive material being applied to the strip, a spring pressed block having a slanting device arranged to be yieldingly pressed into contact with the slanting or beveled-off surface on the stripper at a point below the lower edge of the strip material thereby to close the opening formed by said slanting surface of the stripper whereby dripping of the adhesive material is prevented, a support serving as a gage for the lower edge of said strip, and a block serving as a support for the gage, for the spring pressed block and for the backing member and movable vertically to adjust all three elements at the same time.

13. In a machine for applying adhesive to a strip of material, a container for adhesive material having an outlet opening on a vertical surface thereof, a member backing said strip and movable toward and from said opening to accommodate various thicknesses in strips, a stripper at one side of said exit opening and adjustable to regulate the amount of adhesive material being applied to the strip, a gage member for the upper edge of the strip, and a gage member for the lower edge of said strip, said lower gage member and the backing member being adjustable together in directions toward and from the upper gage member.

14. In a machine for applying adhesive to a strip of material, a container for adhesive material having an outlet opening, and flanges or lips at opposite sides of said outlet opening constructed to project over longitudinal marginal portions of the strip, said flanges or lips being beveled to provide shallow recesses between said flanges or lips and the marginal portions of the strip so that restricted amounts of adhesive may flow into said recesses to become applied to said marginal portions of the strip.

15. In a machine for applying adhesive to a strip of material, a container for adhesive material having an outlet opening, and flanges or lips arranged at opposite sides of said outlet opening to project over the opposite longitudinal marginal portions of the strip, said flanges or lips being spaced somewhat from said marginal portions to provide shallow recesses between the flanges or lips and the marginal portions of the strip so that restricted amounts of adhesive may flow into said recesses to become applied to said marginal portions of the strip.

16. In a machine for applying adhesive to a strip of material, a container for adhesive material having an outlet opening, a backing member for supporting the strip opposite to said outlet opening, and flanges or lips at opposite sides of said outlet opening constructed to project over longitudinal marginal portions of the strip where the latter is supported by said backing member, said flanges or lips being beveled to provide shallow recesses between said flanges or lips and the marginal portions of the strip so that restricted amounts of adhesive may flow into said recesses to become applied to exposed surfaces only of said marginal portions of the strip.

ROUEL R. CAMPBELL.